INVENTOR
Wallace M. Kennedy
BY
L. D. Bush
ATTORNEY

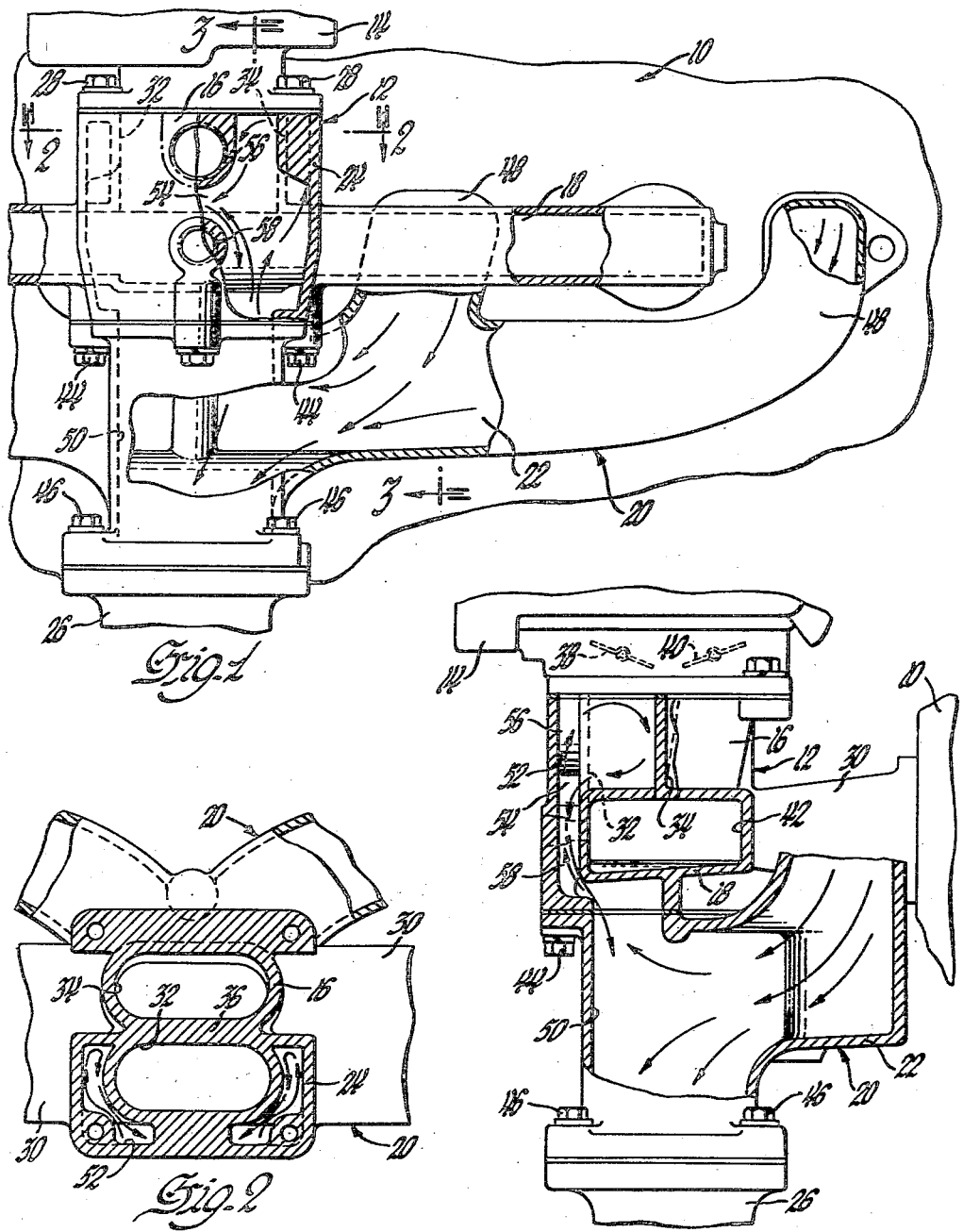

United States Patent Office 2,821,182
Patented Jan. 28, 1958

2,821,182

THROTTLE RISER HEAT APPLICATOR MEANS

Wallace M. Kennedy, Bloomfield Hills, Mich., assignor to General Motors Corporation, Detroit, Mich., a corporation of Delaware Application June 7, 1955, Serial No. 513,696

8 Claims. (Cl. 123—122)

This invention relates generally to means for preheating an engine intake manifold charge, particularly as adapted to four-barrel carburetor operation.

With a four-barrel carburetor, used with a vehicle engine, it is normal to sustain engine operation on only two barrels during engine idle and part-load conditions. The throttle valves of the other carburetor barrels remain closed until full-load conditions require that all four barrels be used. Under part-throttle situations, a great deal of heat is required to preheat the intake charge for proper engine operation and the best fuel economy. However, during full-throttle, high speed conditions, practically no application of heat to the intake charge is required.

It is an object of this invention to provide means for heating only those throttle risers of an engine charge induction system which are used during part-throttle engine conditions.

It is a further object of this invention to provide means for heating part-throttle risers of a charge induction means without heating those risers used only during full-throttle engine conditions.

It is a still further object of this invention to provide means for adapting engine exhaust gases for use in heating only the part-throttle risers of a charge induction system.

It is a purpose of this invention to provide means whereby more heat than normal may be applied to the throttle risers of a four-barrel carburetor system without a sacrifice of maximum horsepower. This is made possible by providing means for heating only the part-throttle risers. Consequently, there is no power loss under full-throttle conditions where the part-throttle riser heat is divided between a greater number of risers, and there is a considerable advantage under part-throttle conditions where a great deal of heat is advantageous.

In the drawings:

Figure 1 is a side view of a fragmentary section of an engine having parts broken away and shown in cross-section and including a four-barrel downshaft carburetor charge induction system embodying the principles of this invention.

Figure 2 is a top sectional view of the throttle riser means of the induction system shown in Figure 1 taken in the plane of line 2—2 and viewed in the direction of the arrows thereon.

Figure 3 is an end sectional view of the throttle riser means of Figure 1 taken substantially in the offset plane of line 3—3 and viewed in the direction of the arrows thereon.

Figure 4:
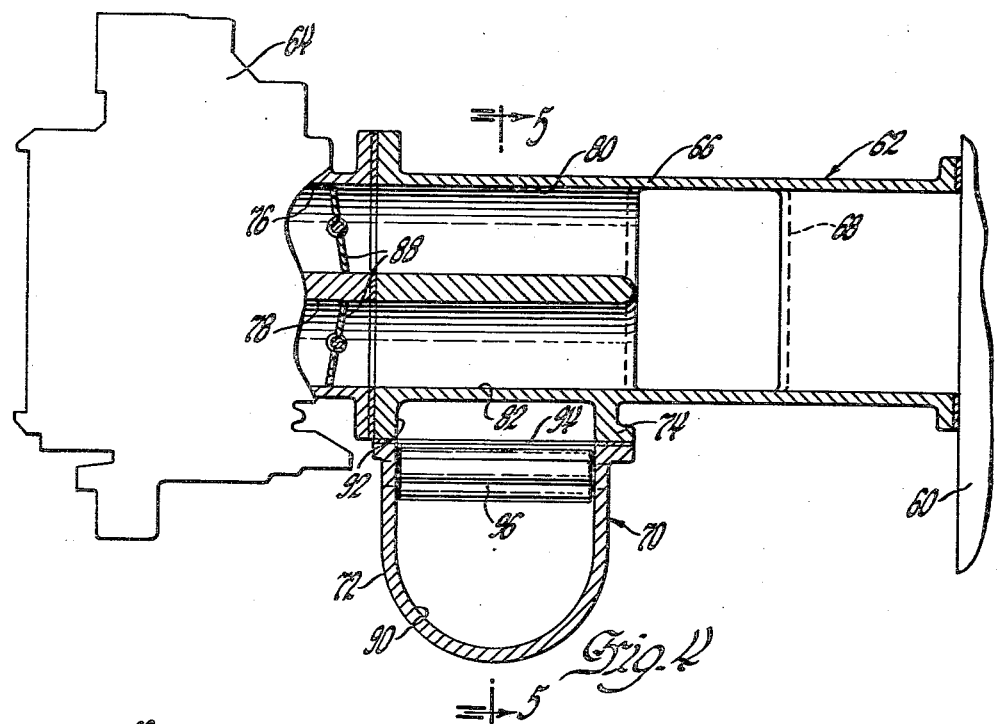
Figure 4 is an end view of a horizontal four-barrel carburetor charge induction system having the throttle risers broken away and shown in cross-section and without the carburetor details disclosed.

Referring first to Figures 1, 2 and 3, there is shown a fragmentary section of an engine 10 which includes a charge induction system 12 having a charge forming device 14, a throttle riser passage member 16, and intake manifold passage means 18. There is also provided an engine exhaust system 20 which includes the exhaust manifold passage means 22, an exhaust heat riser member 24, and an exhaust conduit 26 through which engine gases are finally exhausted.

The charge forming device 14 is preferably of the four-barrel downshaft carburetor type and is here shown secured to the throttle riser passage member 16 by fastening means 28. The intake manifold passage means 18 is formed integrally with the throttle riser passage member 16 and has its passage branches 30 secured to the engine 10 over the intake ports provided therein.

The throttle riser passage member 16 includes two passages 32 and 34 separated by a dividing wall 36. The one passage 32 is disposed directly beneath the part-throttle plate valves 38 of the carburetor member 14 and serves as the part-throttle riser passage. The other passage 34 is disposed beneath the full-throttle plate valves 40 of the carburetor member 14. The part and full-throttle riser passages 32 and 34 communicate with the intake passage 42 provided within the intake manifold 18 and, dependent upon whether one or both of the throttle valves 38 and 40 are opened, deliver a lesser or greater combustible charge through the charge induction system 12 to the engine 10.

Throttle valve 38 of the carburetor member 14 is controlled to operate and open passage 32 under idle or part-load engine conditions while the full-throttle valve 40 and passage 34 remain closed. Under full-load engine conditions both valves 38 and 40 and their respective passages 32 and 34 are open.

The exhaust manifold passage means 22 is secured by fastening means 44 to the throttle riser passage member 16 and has the exhaust conduit 26 secured to it by fastening means 46. The exhaust manifold 22 includes passage branches 48 which are secured to the engine 10 over the exhaust ports provided therein.

Chamber 50 is formed in the exhaust manifold 22 through which all exhaust gases flow into the exhaust conduit 26. Chamber 50 is also in open communication with the heat riser chamber 52 of the exhaust heat riser member 24 which, in the present instance, is formed integrally with the throttle riser passage member 16. The exhaust heat riser member is formed to encompass only the side of the passage member 16 within which is formed the part-throttle riser passage 32. Engine exhaust gases follow the path of the arrows shown in Figures 1 and 3, flowing into chambers 50 and 52. The gases heat the part-throttle riser passage 32 on both sides thereof and across the front through the passage 54 provided between the riser passage support bosses 56 and 58. All of the exhaust gas heat is thus made available to the part-throttle riser passage 32 while the full-throttle riser passage has no purposeful application of exhaust gas heat.

Figure 5:
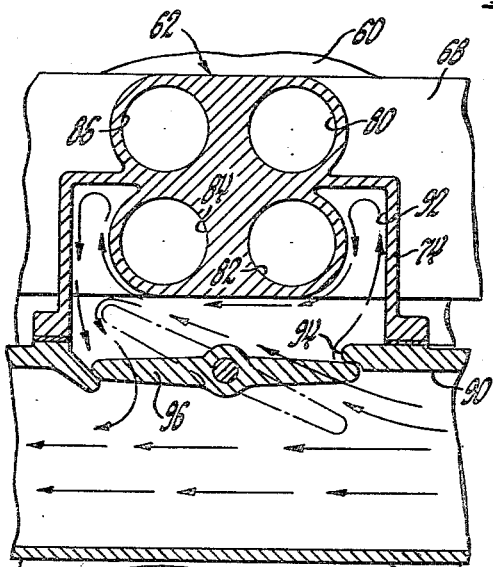
Figure 5 is a cross-sectional view of the horizontal throttle risers of the induction system of Figure 4 taken in the plane of line 5—5 and viewed in the direction of the arrows thereon.
Figure 6:
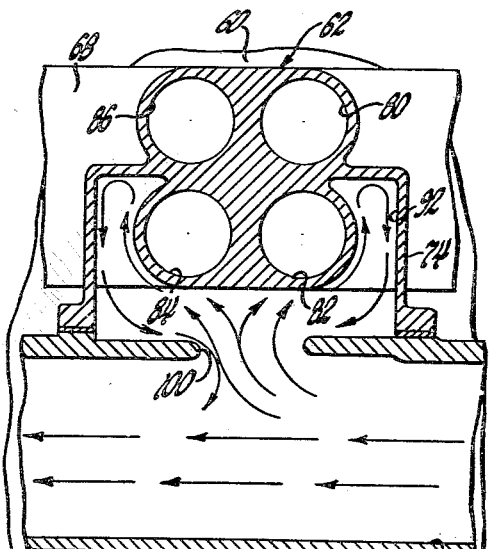
Figure 6 is a modification of Figure 5 showing another throttle riser heating means within the scope of this invention.

Referring now to Figures 4, 5 and 6, there is shown a fragmentary edge of an engine 60 to which is secured a charge induction system 62 including a charge forming device 64, in this instance a horizontal type four-barrel carburetor, a horizontal throttle riser passage member 66, and an intake passage member 68. There is also shown an engine exhaust system 70 which includes the exhaust manifold passage means 72, an exhaust heat riser member 74, and an exhaust conduit (not here shown).

The carburetor 64 and throttle riser passage member 66 are formed to provide four barrels within the carburetor member (only two of which are shown and are designated as 76 and 78) and four mating passages 80, 82, 84, and 86 in the riser member. Throttle valve plates 88 are provided in each of the carburetor barrels and control the charge flow to the riser passages.

The exhaust manifold 72 is secured beneath the intake manifold 66 in a convenient manner and is formed to provide an exhaust passage 90 communicating with the exhaust gas heat chamber 92, formed in the exhaust gas riser member 74, through opening 94. The exhaust gas heat chamber encompasses only two of the riser passages, here 82 and 84, which are used as the part-throttle heat riser passages. The other riser passages 80 and 86 serve as the full-throttle riser passages.

In the embodiment of Figures 4 and 5 there is provided an exhaust gas pypass flapper valve 96 which may be positioned to deflect exhaust gases into heat chamber 92 as shown in phantom outline or may be closed as shown in full line view. The bypass valve 96 would be controlled as other known and accepted exhaust gas bypass valve means of such nature.

Figure 6 is a slight modification of the embodiment of Figures 4 and 5 and has been numbered as to similar parts as Figures 4 and 5. There is no bypass valve means provided in the embodiment of Figure 6 and a smaller opening 100 is provided between exhaust passage 90 and heat chamber 92 to induce a flow of exhaust gases into the heat chamber.

The claims:

1. In an engine including a charge induction system comprising a throttle riser passage member having separate throttle riser passages formed therein, throttle riser heat applicator means provided about only part of said throttle riser passage member for heating fewer than all of said riser passages.

2. In an engine including a charge induction system and an exhaust gas system, a passage member comprising part of said induction system and having separate part-throttle and other passage means provided therethrough, and heat passage means comprising part of said exhaust system and provided about only that part of said induction system passage member including said part-throttle passage means.

3. In an engine including a charge induction system comprising a multi-barrel carburetor member having a plurality of separte charge forming passages formed therein, a throttle riser passage member having separate passages formed therein and communicating with separate of said charge forming passages, an engine exhaust gas system including an exhaust gas bypass passage member, said bypass passage member being disposed about only that part of said throttle riser passage member including some of said charge forming passages.

4. An engine including, a charge induction system comprising charge forming means and separate part-throttle and full-throttle charge conveying passage means, a system for exhausting engine exhaust gases including an exhaust gas heat riser, said heat riser being disposed about only said part-throttle passage means.

5. An engine charge induction system including a charge forming device, a charge receiving passage member secured to said charge forming device and formed to provide separate flow passages therethrough, an intake manifold connected to said charge receiving passage member for conveying said charge to an engine, and heat riser passage means formed about part only of said passage member and in communication with gases exhausted from an engine for heating only some of said flow passages.

6. A charge induction system for an internal combustion engine which includes a downdraft carburetor having a plurality of separate charge forming passages, an intake manifold having said carburetor secured thereto and including separate riser passages provided therein for communication with separate of said charge forming passages, and heating means provided about that part of said intake manifold including one of said riser passages for heating the combustible charge passing through only said one riser passage.

7. A charge induction system for internal combustion engines which includes a charge forming device having multipule and separate charge forming means, a charge intake manifold having said device secured thereto and including a riser passage member having riser passages formed therein for communication with separate of said charge forming means, a passage member formed about that part only of said riser passage member including one of said riser passages, and a heat passage formed in said passage member and open for communication with exhaust gas heating means for heating only said one riser passage.

8. A charge induction system as provided in claim 7 including valve means disposed at the open end of said heat passage for opening and closing said heat passage.

References Cited in the file of this patent

UNITED STATES PATENTS 2,686,506    Carpentier et al. _____ Aug. 17, 1954

U. S. DEPARTMENT OF COMMERCE
PATENT OFFICE
CERTIFICATE OF CORRECTION

Patent No. 2,821,182 January 28, 1958

Wallace M. Kennedy

It is hereby certified that error appears in the printed specification of the above numbered patent requiring correction and that the said Letters Patent should read as corrected below.

Column 1, line 56 and column 2, line 16, for "downshaft", each occurrence, read -- downdraft --; column 3, line 20, for "pypass" read -- bypass --; column 4, line 35, for "multipule" read -- multiple --.

Signed and sealed this 20th day of May 1958.

(SEAL)

Attest:

KARL H. AXLINE
Attesting Officer

ROBERT C. WATSON
Commissioner of Patents